March 22, 1955     D. BUSHBY     2,704,697
EXPANSIBLE PISTONS

Filed May 24, 1950     2 Sheets-Sheet 1

INVENTOR
David Bushby

March 22, 1955  D. BUSHBY  2,704,697
EXPANSIBLE PISTONS
Filed May 24, 1950  2 Sheets-Sheet 2

INVENTOR
David Bushby

United States Patent Office 2,704,697
Patented Mar. 22, 1955

2,704,697

EXPANSIBLE PISTONS

David Bushby, Regina, Saskatchewan, Canada, assignor to Vacuum Air Pressure Company Limited, Regina, Saskatchewan, Canada, a corporation of Saskatchewan Application May 24, 1950, Serial No. 163,824

10 Claims. (Cl. 309—12)

This invention relates to pistons and is a continuation in part of my United States patent application for Expansible Pistons, Serial No. 29,697 filed May 28, 1948, such application now having been abandoned.

An important object of my invention is to provide a piston of relatively simple construction and one which, when first assembled with a cylinder, can be accurately and effectively adjusted thereto.

A further object of the invention is to provide a piston arranged and adapted to engage within the cylinder wall in such a manner as to function efficiently and avoid wobble under all conditions of operation, to minimize the rate of wear of the interengaging parts, and to compensate for such wear over an extended initial period of use.

A further object of the invention is to provide a piston construction, including a head and a skirt portion, wherein yielding parts of the skirt normally engage the cylinder wall snugly with a tolerance fit therewith or without clearance while other parts are slightly spaced therefrom so that the piston is supported circumferentially and at spaced intervals in the cylinder and the piston skirt cannot seize or stick in the cylinder.

A further object of the invention is to provide a piston having adjustable expansible skirt portions which may be made of relatively rigid construction integral with the piston skirt frame members.

A further object of the invention is to provide simple and effective skirt adjusting or expanding means adapted for use with a piston of the integral type assembled within a cylinder.

A further object of the invention is to provide a piston skirt construction wherein relatively resilient or yielding cylinder engaging portions are combined with more rigid portions normally not engaging the cylinder and having reinforcing means to furnish added means and stamina to the parts where required for durability and more economical and effective operation.

A further object of the invention is to provide a piston having cylinder engaging parts which, after becoming worn by use, can be readily adjusted to re-establish effective piston-cylinder engagement, and to provide means for releasably securing said parts in such engagement.

A further object of the invention is to provide skirt expanding or oversizing means whereby the proper extent of correction can be made by adjusting the parts and securing them in adjusted position without throwing the piston out of accurate coaxial alignment with the cylinder bore.

It is contemplated that such adjustments can be made quickly and accurately and with the piston remaining in the cylinder if necessary by the manipulation of non-tapered plug type expander screws carried in part by or forming part of the piston as initially assembled.

A further object of the invention is to design a piston skirt construction which provides complete circumferential support for the piston skirt within the cylinder wall and thus relieve the piston rings of the burden of holding the piston head in axial alignment with the cylinder wall.

A further and important object of this invention is to supply frame members for connecting the piston head to the piston skirt.

A further important object of this invention is to supply a piston skirt mounted on frame members, wherein one thrust face of the skirt is non-yielding, whereas the other diametrically opposed thrust face is yielding to prevent seizing of the piston to its cylinder wall while operatively mounted therein.

A still further and important object of this invention is to supply circumferential tapered passageways between the piston pin boss construction and the piston skirt frame members to receive non-tapered expansion means.

Other objects and advantages inherent in my invention will be apparent from the following description of an embodiment thereof and the appended drawings wherein:

Figure 1 is a view in elevation of the non-resilient thrust face of the piston skirt, also illustrating the piston head as being integrally connected to the piston skirt by frame members in zones C or lower piston head side wall D shown in Fig. 4 and the cylinder contacting portions of said skirt outer surfaces are shaded with vertical lines, and the free surfaces thereof unlined.

Figure 2 is a view in elevation of the resilient thrust face of the piston skirt also illustrating the piston head as being integrally connected to the piston skirt frame members in the circumferential zone C or lower piston head side wall D as illustrated in Figure 4, and the cylinder contacting portions of said skirt outer surfaces are shaded with vertical lines and the free surfaces thereof unlined.

Like reference numerals refer to like parts throughout the specification and drawings.

Figure 1:
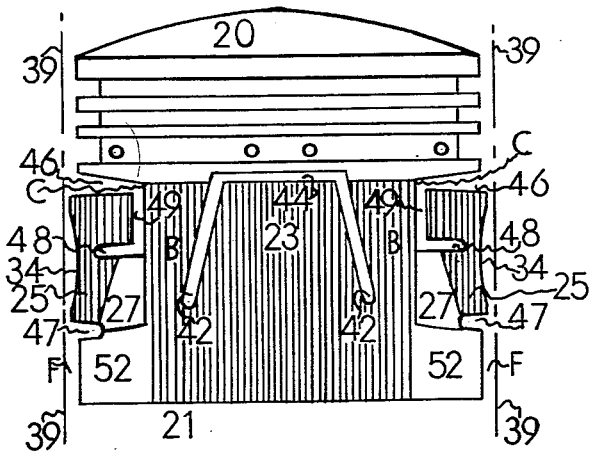

Referring to the drawings, a piston according to my invention comprises a head 20 and skirt frame members 37 and skirt 21 integrally assembled. The piston is formed of conventional material such as cast iron, aluminum or an alloy of aluminum, or other suitable material capable of resisting the strains and high temperatures to which the piston is subjected in use. The piston is illustrated as fitted into a cylinder 39.

Figure 4:
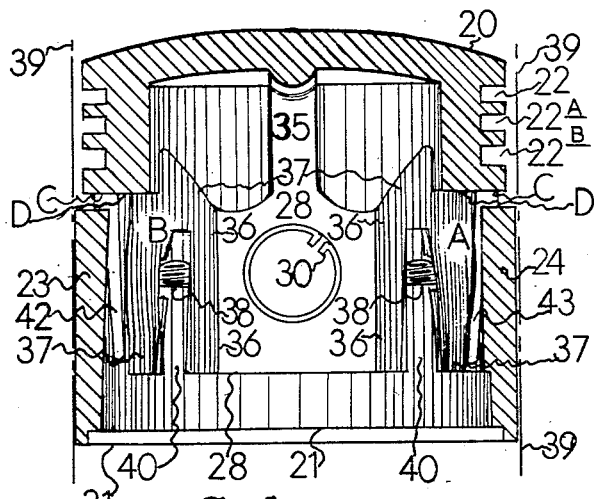
Figure 4 is a vertical central section on the line 4—4 of Figure 2.

The piston ring compression grooves 22, 22a, and oil ring grooves 22b, see Figure 4, are formed in the piston head into which the conventional types of compression and oil rings may be fitted according to conventional practice.

Figure 2:
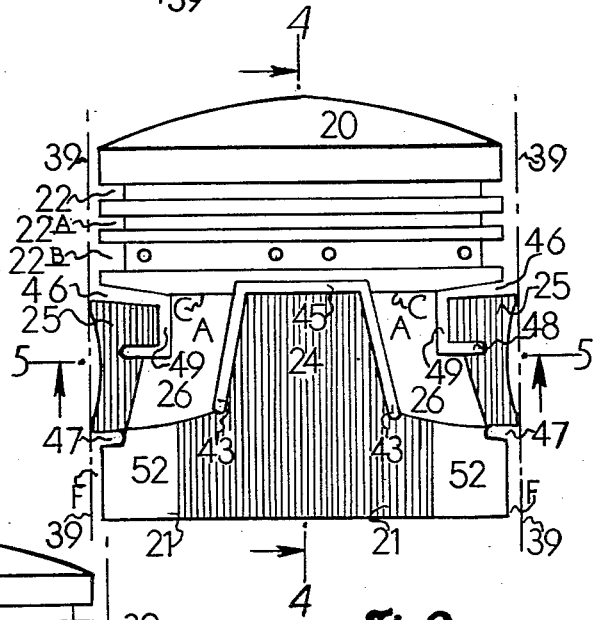

The piston skirt 21 is integral with the frame members 37 and is formed with a non-resilient thrust face 23, Figure 1. Figure 2 illustrates the piston being turned 180 degrees from its position as shown in Figure 1 displaying the resilient thrust face 24. The resilient wing portions 25 are defined by horizontal slots 46, 47 and 48 and vertical slots 49 and vertically inclined slots 50 and 51, and the wing members are separated from the thrust faces by relief areas 26 and 27 as hereinafter disclosed. The thrust faces are defined by vertically inclined slots 42 and 43 and horizontal slots 44 and 45. The thrust faces and wing portions are cylinder contacting members and are designated by vertical lines of shading and the relief or free areas which do not contact the cylinder wall are unshaded. The resilient wings and thrust faces it is observed, are disposed between the piston head and the base of the piston skirt.

The non-resilient or rigid cylinder engaging parts in zone B of the thrust face of the piston skirt 21 is designed to fit snugly in the cylinder 39 to a tolerance fit, for example, about 0.001 of an inch clearance, within the cylinder wall to withstand the thrust pressures caused by the angular positions of the connecting rod and the force of the explosions within the combustion chamber during the power stroke of the piston. The non-resilient thrust face is defined by small relief areas 27, which extend between the non-resilient thrust face 23 or shaded areas in B zone, and the wing members 25, and extends from the end of the horizontal slot 47 to the horizontal slot 46, and is bordered on its lower end by the cam ground areas 52.

The resilient thrust face 24 is designed to withstand the thrust pressures to which the piston skirt is subjected caused by the compression and angular positions of the connecting rod during the compression stroke of the piston. The resilient thrust face is diametrically opposite to the non-resilient thrust face and is defined by large relief areas 26 which extend between the resilient thrust face 24 and the wing members 25 to permit the piston skirt thrust face to yield in the cylinder rather than to seize under abnormal piston expansion which may be caused from overheating.

The smaller relief areas 27 are designed to permit yielding of the wing members 25, also to leave the frame members 37 covered with metal around and in the zones B, so as the portions of the skirt directly over the frame members 37 and integral therewith in B zones will contact the cylinder wall rendering the thrust plate 23 to be inactive as to resiliency.

The resilient wing members 25 are positioned between the resilient thrust face 24 and non-resilient thrust face 23, and are designed to prevent side play and to hold the piston firmly in axial alignment with the cylinder wall. These members are designed to provide in circumferential combination with the resilient and non-resilient thrust faces complete circumferential support for the piston skirt within the cylinder. The wing members are separated from the non-resilient thrust face by the relief areas 27 and from the resilient thrust face by the larger relief areas 26.

The cam ground areas 52 at the base of the piston skirt is conventional practice, with this exception that the cam ground area is from the bottom of the piston skirt and upwardly thereof for approximately one third of said piston skirt length.

Referring now to the detailed construction of the piston skirt, the numeral 28 indicates diametrically opposed pin bosses projecting downwardly from the piston head and spaced from the piston skirt 21 and having apertures therein to receive the piston pin 29, which may be held securely in place by conventional lock rings 30 positioned in the lock ring grooves 31 which are machined out of the pin bosses 28. Wing apertures 34 are of a larger diameter than the pins 29 in order that the piston pins 29 cannot contact the inner periphery of the wing apertures 34.

Figure 5:
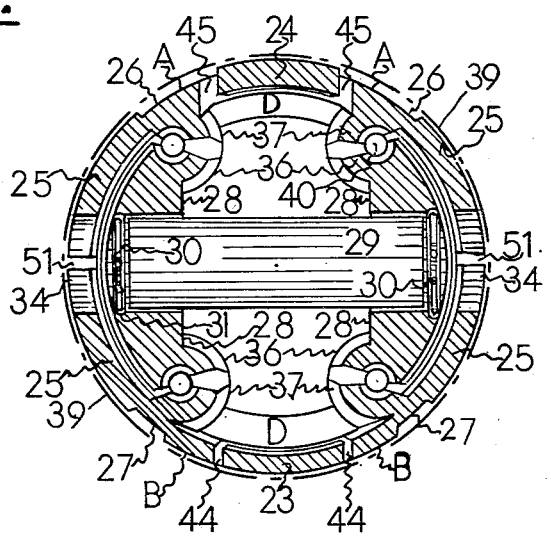
Figure 5 is a transverse horizontal section on the line 5—5 of Figure 2.
Figure 6:
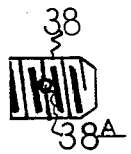
Figure 6 is a horizontal elevation of the piston skirt frame member bender, and skirt expander non-tapered plug type screw.
Figure 7:
Figure 7 is a horizontal elevation of the wrench receiving socket end of the piston skirt expander screw as seen in Figure 6.

The frame members 37 of the piston skirt are joined integral with the lower side wall of the piston head at D as illustrated in Figures 4 and 5. These frame members extend or project from the piston head to a point adjacent to the bottom of the piston skirt. And from the intermediate portions of the frame members to their lower extremities is integrally positioned thereon the piston skirt, a rib 35, see Figure 4, is formed in the piston head and integral therewith and extends transversely across the inside wall of the piston head to provide support for the crown of the piston head and extends downwardly along the side wall of the piston head and integral therewith to provide reinforcement for pin bosses 28.

The pin boss supporting ribs 36 are integral with the pin bosses 28 and extend from the upper extremities of said bosses and along the edge of each boss to the lower end thereof. The supporting ribs 36 are designed to provide extra strength to the pin bosses 28, and to provide supporting means for the expander screw 38. Illustrated in Figures 4 and 5 are circumferential tapered passageways 40 equispaced around the pin bosses and between the pin bosses 28 and frame members 37. The non-tapered plug type expander screw 38 is threaded through each passageway to bear against the side of the skirt frame members 37 and to cause said members to bend in the zones A and B and raise the cylinder contacting portions of the piston skirt into contact with the engine cylinder wall 39, the head of the screws 38 may be adapted to receive a wrench in the socket end 41 for tightening purposes, a wire may be passed through the apertures 38a to retain each screw in its predetermined position.

In the use of the expander illustrated in Figure 4, each screw 38 is adjusted until the entire piston skirt is expanded and brought into the desired tolerance fit within the cylinder wall. As this type of piston expander is relatively unyielding, the piston skirt should be expanded carefully and accurately.

The expander device illustrated in Figure 4 comprises an expander screw 38 which is threaded into a passageway 40 provided between the piston skirt frame members 37 and the piston pin bosses 28. As the screw 38 is turned into this passageway it serves to force and bend the frame members 37 outwardly which carry all cylinder engaging members of the skirt to the cylinder wall. The expander screws 38 are equi-spaced around the piston skirt so that all portions of the piston skirt may be expanded outwardly and brought into tolerance fit with the cylinder wall.

The non-resilient thrust face 23 is rendered inactive to yield inwardly from the cylinder wall when subjected to abnormal pressure caused through abnormal heat conditions, owing to its outer circumference being in the same circumferential plane as the rigid skirt portions in zones B illustrated in Figures 4 and 5 which also contact the cylinder wall on either side of the thrust plate 23, see Figure 5, while the resilient thrust face 24 of the piston skirt 21 is bordered on each side by relief areas 26 which do not contact the cylinder wall, see Figure 5, and allows the thrust plate 24 to yield inwardly from the cylinder wall when subjected to abnormal pressure from the cylinder wall caused through abnormal heat conditions.

It is to be noted that the resilient thrust member 24 and all wing members 25 are designed to yield to the cylinder wall rather than seize. The bottom end of the skirt 21 is continuous (not split) and cam ground to produce an elliptical contour configuration of the bottom extremities of said skirt to prevent seizure of the bottom of said skirt to the cylinder wall when operatively assembled in an engine cylinder.

When the screws or expander plugs 38 are expanding the frame members 37 outwardly, the bottom of the skirt holds against such expansion sufficiently to cause the frame members 37 to bend at the upper end where the skirt 21 becomes integral with the frame members 27, thus all cylinder contacting portions of the piston skirt 21 are expanded parallel longitudinally and circumferentially to the cylinder wall, which can be more readily seen in Figures 2, 4 and 5 where the threaded expander plugs 38 have been threaded upwardly into the passageways 46 as illustrated in Figure 4.

Figures 1 and 2 illustrates that the cam ground areas 52 at the bottom of the piston skirt are spaced from the cylinder wall 39 to leave a clearance at F and it is to be noted that the piston and cylinder wall as shown in Figure 1 have worn away from each other leaving an undesirable clearance as illustrated between the wing portions 25 and the cylinder 39. It is to be further understood that all other shaded areas of the piston have also the same amount of wear and undesirable clearance for the complete circumference of the piston in the wing zone area.

Figure 2 illustrates the wing portions as expanded out to the cylinder wall and all other shaded areas of the piston skirt is in contact with the cylinder wall.

Figure 3:
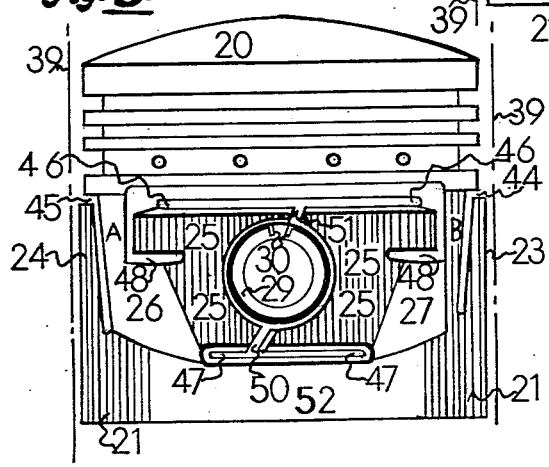
Figure 3 is a view in elevation of the wing side of the piston skirt with the cylinder contacting portions of the outer surfaces of said skirt lined vertically and the free surfaces thereof unlined.

Figure 3 illustrates the thrust faces 23 and 24 as being spaced from the cylinder wall and all other shaded areas of the piston skirt cylinder contacting members are in this position relative to the cylinder wall for the complete circumference of the piston skirt.

Figure 4 illustrates the thrust faces 23 and 24 expanded outwardly and into contact association with the cylinder wall 39.

Figure 5 illustrates the piston expanded to the cylinder wall 39 showing the thrust faces 23 and 24 and wing members 25 in circumferential contact with the cylinder wall 39. Figure 5 also illustrates the small relief areas 27 and the large relief areas 26 in their position to the cylinder wall 39.

Circumferential slots 46 are provided between the piston head and the piston skirt wing members and extend between and terminate at the upper extremities of the frame structures 37 and junction with the vertical slots 49.

It is to be further noticed that slots 44, 45 and 42 separate the entire cylinder contacting piston skirt portions from the piston head except for small arcs at the upper margins of the "B" zones, and that the piston head and skirt are connected by the frame members 37 only which do not contact the cylinder.

The piston of the present invention has a number of important advantages. The arrangement of the resilient and non-resilient thrust faces and the wing members provided complete circumferential support for the piston and retain it in axial alignment with the cylinder wall for the full extent of the reciprocal movement of the piston, and thus relieve the piston rings of an important source of wear and aid the rings to retain better compression. The expander arrangement makes possible the expansion or oversizing of the piston skirt very easily and, if necessary, without removing the piston from the cylinder to bring the parts of the piston skirt into tolerance fit within a worn cylinder wall. Also, the piston is sturdy in construction, it may be manufactured inexpensively, and is durable in use.

It will be understood, of course, that modifications may be made in the preferred embodiment of the invention described and illustrated herein without departing from the scope of the invention as defined by the appended claims.

Having thus described my invention, what I claim and desire to protect by Letters Patent of the United States is:

1. A piston body having a head and a continuous skirt, said piston head and said skirt being joined together in spaced relation to each other by frame members integral with the inner periphery of said skirt and the upper ends of said frame members being integral with the lower side wall of said piston head, said piston skirt being provided with thrust wall portions and joined to said piston head by said frame members only, a pair of aligned, spaced diametrically disposed, downwardly depending, piston pin bosses within the hollow interior of said skirt and spaced therefrom, and integral with the piston head at their upper extremities only, the thrust portions of the said piston skirt being separated circumferentially from said piston head by a series of spaced slots extending through the wall of the skirt and means for expanding the thrust portions of the said skirt outwardly.

2. A piston body having a head and skirt, said skirt being mounted on frame members and integral therewith, a resilient cylinder engaging thrust member between said frame members in said skirt defined by vertical inclined slots along each side of said thrust member and said vertical slots junctional at their upper ends with a transverse horizontal slot, and said vertical inclined slots are bordered by relief areas over said frame members which do not engage the cylinder wall, said relief areas and said thrust member defining a resilient thrust face of the said piston skirt between the piston head and the base of the skirt.

3. A piston body having a head and skirt portions, supporting frame members extending from the skirt to the head and integral therewith, said piston skirt including a non-resilient thrust face and a resilient thrust face, resilient wing members between the thrust faces intermediate the piston head and skirt base and separated therefrom by relief areas, opposing wrist pin receiving bosses carried by the piston head within the piston skirt and spaced therefrom having supporting ribs integrally positioned thereon.

4. A piston body having head and skirt portions, supporting means extending from said skirt to said head and integral therewith, said skirt intermediate its length including a non-resilient thrust face and an oppositely disposed resilient thrust face, resilient wing members between said thrust faces and separated therefrom by relief areas, generally vertical slots connected by a generally horizontal slot in each thrust face defining expansible portions thereof, circumferential slots between said head and skirt portions extending toward and terminating short of said generally vertical slots, and means disposed within said skirt for expanding portions of said skirt to bring said skirt into tolerance fit within the cylinder wall.

5. A piston body having head and skirt portions mounted on frame members and integral therewith and wrist pin bosses integral with said head said bosses projecting downwardly within said skirt and spaced therefrom, said skirt being provided with wrist pin receiving openings therein each arranged opposite one of said bosses and at one side of the thrust plane of the piston, circumferentially extending slots spaced apart longitudinally of the skirt and connected with one of said wrist pin receiving openings by longitudinally extending slots, and circumferentially extending slots spaced apart circumferentially and disposed between said first mentioned circumferentially extending slots, and each connected to one thereof by a longitudinally extending slot, said slots and said wrist pin opening being arranged and adapted to define a resilient wing member intermediate the piston head and skirt base at each side of said wrist pin opening and of a median plane normal to the thrust plane of said piston.

6. A piston body having a head and a skirt, said skirt being provided with interiorly disposed spaced frame members extending from the head end thereof toward the opposite end thereof, a thrust member arranged in the thrust plane of the piston between adjacent frame members, and wing members arranged between other adjacent frame members, outer surfaces of said thrust members and said wing members being extended outwardly towards cylinder engaging position intermediate the piston head and skirt base, and outer surfaces of said skirt on one thrust plane of said skirt between said thrust and wing members being relatively less extended to clear the cylinder bore when in operative position in a cylinder.

7. A piston body having a skirt wall provided with spaced relatively rigid frame members extended in contact association with a cylinder wall on one thrust plane of said skirt and diametrically opposed spaced frame members in the other thrust face of said skirt in spaced association with the cylinder wall when said skirt is operatively assembled with an engine cylinder, resilient wing members, and resilient thrust members, defined in part by vertical and longitudinal slots cut through said wall between said rigid frame members thereof intermediate the piston head and skirt base, said resilient members being extended for yielding contact with a cylinder and some of said rigid frame members being extended and some of said frame members being less extended to afford clearance between said outwardly exposed areas of said rigid frame members and said cylinder when the piston is operatively positioned therein.

8. A piston body having a head and a skirt comprising an approximately cylindrical wall, spaced frame members projecting inwardly from said wall and extending longitudinaly from said piston head downwardly to a point adjacent the base of the piston skirt, a pair of resilient wing members intermediate the piston head and skirt base extending circumferentially toward each other from adjacent frame members and a resilient thrust member extending longitudinally of said skirt towards said head end thereof.

9. A piston body having a skirt comprising relatively rigid wall portions having outer surfaces adapted to be out of contact with the cylinder wall when the piston is mounted in a cylinder, frame members projecting inwardly from inner surfaces of said rigid wall, and relatively resilient wall portions intermediate the piston head and skirt base having a cylinder wall engaging outer surfaces and being supported by and extending circumferentially in opposite directions from each of said frame members.

10. A piston body wherein parts of the skirt wall adjacent to the head end thereof are resilient and parts are relatively rigid the said resilient parts providing extended cylinder engaging surfaces intermediate the piston head and skirt base separated circumferentially by less extended surfaces of said relatively rigid parts, and portions of the skirt wall adjacent to the open end thereof are of substantially elliptical cross-sectional contour and provide extended cylinder engaging surfaces in the median plane of the thrust axis of the piston which are continuous with cylinder engaging surfaces provided by some of said resilient parts, and means for expanding the resilient parts.

References Cited in the file of this patent

UNITED STATES PATENTS

| 1,543,409 | Wiggers et al. | June 23, 1925 |
| 1,890,511 | Johnston | Dec. 13, 1932 |
| 1,990,815 | Clark | Feb. 12, 1935 |
| 2,005,373 | Johnston | June 18, 1935 |
| 2,087,761 | Johnston | July 20, 1937 |
| 2,194,247 | Russel | Mar. 19, 1940 |
| 2,464,554 | Bushby | Mar. 15, 1949 |
| 2,497,380 | Venner et al. | Feb. 14, 1950 |

FOREIGN PATENTS

| 149,185 | Switzerland | Nov. 2, 1931 |
| 295,467 | Italy | Apr. 22, 1932 |
| 196,043 | Switzerland | May 16, 1938 |